(12) United States Patent
Alspach et al.

(10) Patent No.: US 11,628,576 B2
(45) Date of Patent: Apr. 18, 2023

(54) DEFORMABLE SENSORS AND METHODS FOR DETECTING POSE AND FORCE AGAINST AN OBJECT

(71) Applicant: Toyota Research Institute, Inc., Los Altos, CA (US)

(72) Inventors: Alexander Alspach, Somerville, MA (US); Russell L. Tedrake, Needham, MA (US); Kunimatsu Hashimoto, Brookline, MA (US); Erik C. Sobel, Newton, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/823,701

(22) Filed: Aug. 31, 2022

(65) Prior Publication Data

US 2022/0410403 A1    Dec. 29, 2022

Related U.S. Application Data

(63) Continuation of application No. 17/243,664, filed on Apr. 29, 2021, now Pat. No. 11,465,296, which is a
(Continued)

(51) Int. Cl.
*G01B 11/16* (2006.01)
*B25J 13/08* (2006.01)
(Continued)

(52) U.S. Cl.
CPC .......... *B25J 13/084* (2013.01); *B25J 9/1633* (2013.01); *B25J 13/085* (2013.01); *G01B 11/16* (2013.01);
(Continued)

(58) Field of Classification Search
CPC ............. G01B 11/16; G01L 1/24; G01L 1/04
See application file for complete search history.

(56) References Cited

U.S. PATENT DOCUMENTS

| 7,707,001 B2 | 4/2010 | Obinata et al. |
| 8,231,158 B2 | 7/2012 | Dollar |

(Continued)

FOREIGN PATENT DOCUMENTS

| CN | 103124946 A | 5/2013 |
| CN | 107113372 A | 8/2017 |

(Continued)

OTHER PUBLICATIONS

Dimitris Hristu et al., Technical Research Report, "The Performance of a Deformable-Membrane Tactile Sensor: Basic Results on Geometrically-Defined Tasks", Center for Dynamics and Control of Smart Structures (CDCSS), 1999, Harvard University and University of Maryland, 8 pages, http://www.dtic.mil/dtic/tr/fulltext/u2/a439988.pdf.

(Continued)

*Primary Examiner* — Jamel E Williams
(74) *Attorney, Agent, or Firm* — Dinsmore & Shohl LLP

(57) ABSTRACT

Systems and methods for detecting pose and force against an object are provided. A method includes receiving a signal from a deformable sensor comprising data from a deformation region in a deformable membrane resulting from contact with the object utilizing an internal sensor disposed within an enclosure and having a field of view directed through a medium and toward a bottom surface of the deformable membrane. The method also determines a pose of the object based on the deformation region of the deformable membrane. The method also determines an amount of (Continued)

force applied between the deformable membrane and the object is determined based on the deformation region of the deformable membrane.

19 Claims, 12 Drawing Sheets

Related U.S. Application Data continuation of application No. 16/864,874, filed on May 1, 2020, now Pat. No. 11,007,652, which is a continuation of application No. 15/909,742, filed on Mar. 1, 2018, now Pat. No. 10,668,627.

(60) Provisional application No. 62/563,595, filed on Sep. 26, 2017.

(51) Int. Cl.
| | |
|---|---|
| B25J 9/16 | (2006.01) |
| G01L 1/24 | (2006.01) |
| G01L 5/00 | (2006.01) |
| G01L 1/04 | (2006.01) |
| B25J 18/06 | (2006.01) |
| G05B 19/18 | (2006.01) |

(52) U.S. Cl.
CPC .......... *G01L 1/04* (2013.01); *G01L 1/24* (2013.01); *G01L 5/009* (2013.01); *G01L 5/0061* (2013.01); *B25J 18/06* (2013.01); *G05B 19/18* (2013.01); *G05B 2219/39319* (2013.01); *G05B 2219/40201* (2013.01); *G05B 2219/40253* (2013.01); *Y10S 901/09* (2013.01); *Y10S 901/30* (2013.01); *Y10S 901/46* (2013.01); *Y10S 901/47* (2013.01)

(56) References Cited

U.S. PATENT DOCUMENTS

| | | | |
|---|---|---|---|
| 8,411,140 B2 | 4/2013 | Adelson | |
| 8,699,141 B2* | 4/2014 | Aschwanden | G02B 26/0825 359/666 |
| 9,127,938 B2 | 9/2015 | Adelson et al. | |
| 9,605,952 B2 | 3/2017 | Rose et al. | |
| 9,802,314 B2 | 10/2017 | Yamane et al. | |
| 2009/0326714 A1 | 12/2009 | Buckingham et al. | |
| 2012/0240691 A1* | 9/2012 | Wettels | G01L 1/24 73/862.624 |
| 2013/0070074 A1 | 3/2013 | Won | |
| 2013/0275082 A1 | 10/2013 | Follmer et al. | |
| 2014/0104395 A1 | 4/2014 | Rohaly et al. | |
| 2017/0239821 A1 | 8/2017 | Lessing et al. | |
| 2019/0091871 A1 | 3/2019 | Alspach et al. | |
| 2019/0091872 A1 | 3/2019 | Alspach et al. | |
| 2019/0171004 A1 | 6/2019 | Bretagnol et al. | |

FOREIGN PATENT DOCUMENTS

| | | |
|---|---|---|
| JP | 60-115887 A | 6/1985 |
| JP | 61283842 A | 12/1986 |
| JP | 2005-257343 A | 9/2005 |
| JP | 2008-149443 A | 7/2008 |
| JP | 2009-145085 A | 7/2009 |
| JP | 2009-198475 A | 9/2009 |
| JP | 2010-221358 A | 10/2010 |
| JP | 2011-007557 A | 1/2011 |
| JP | 2011-525284 A | 9/2011 |
| JP | 2011-529189 A | 12/2011 |
| JP | 2012-42220 A | 3/2012 |
| JP | 2012-141255 A | 7/2012 |
| JP | 2013-061223 A | 4/2013 |
| JP | 2013-130426 A | 7/2013 |
| JP | 2013-205131 A | 10/2013 |
| JP | 2016-510419 A | 4/2016 |
| WO | 02/063549 A1 | 8/2002 |

OTHER PUBLICATIONS

Gelsight, Inc., "GelSight Benchtop Scanner", 2017, 1 page, http://www.gelsight.com/.
Alexander Alspach et al., "Design of a Soft Upper Body Robot for Physical Human-Robot Interaction", Disney Research, Pittsburgh, PA, Nov. 4, 2015, https://disneyresearch.com/publication/design-of-a-soft-upper-body-robot/, 8 pages.
Micah K. Johnson et al., "Retrographic sensing for the measurement of surface texture and shape", Jun. 20, 2009, 8 pages. DOI: 10.1109/CVPR.2009.5206534.
Micah K. Johnson et al., "Microgeometry Capture using an Elastomeric Sensor", ACM Trans. Graph. 30 (4) (2011) 46:1-46:8, doi:10.1145/2010324.1964941. 8 pages.
Leif P. Jentoft et al., "Determining Object Geometry with Compliance and Simple Sensors", In the Proceedings of the IEEE/RSJ International Conference on Intelligent Robots and Systems, San Francisco, CA, Sep. 25-30, 2011: 3468-3473, doi:10.1109/IROS.2011.6094692, http://nrs.harvard.edu/urn-3:HUL.InstRepos:22108933, 7 pages.
Joao Bimbo et al., "In-Hand Object Pose Estimation Using Covariance-Based Tactile To Geometry Matching", IEEE Robotics and Automation Letters, Jan. 2016, DOI: 10.1109/LRA.2016.2517244, https://www.researchgate.net/publication/290509006_In-Hand_Object_Pose_Estimation_Using_Covariance-Based_Tactile_To_Geometry_Matching, 9 pages.
Joohyung Kim et al., "3D Printed Soft Skin for Human-Robot Interaction", Disney Research, Sep. 28, 2015, 1 page.
Joohyung Kim et al., "3D Printed Soft Skin for Safe Human-Robot Interaction", Disney Research, Pittsburgh, PA, https://www.disneyresearch.com/publication/3dprinted-soft-skin/, Sep. 28, 2015, DOI: 10.1109/IROS.2015.7353705, 7 pages.
Notice of Reasons for Rejection dated Jun. 1, 2021 in related Japanese Application No. 2018-180899 (14 pages total).
First Office Action dated Jun. 16, 2021 in related Chinese Application No. 201811124448.9 (26 pages total).
F. Remondino et al., "TOF Range-Imaging Cameras", National Defense Industry Press, Aug. 31, 2016 (15 pages total).
Notice of Reasons for Rejection in related Japanese Patent Application No. 2018-180908 dated Jul. 6, 2021, pp. 1-10.
Naveen Kuppuswamy, et al.; "Soft-Bubble Grippers for Robust and Perceptive Manipulation"; 2020 IEEE/RSJ International Conference on Intelligent Robots and Systems; Oct. 25-29, 2020; 11 pgs; https://arxiv.org/abs/2004.03691.
Goro Obinata, et al.; "Vision Based Tactile Sensor Using Transparent Elastic Fingertip for Dexterous Handling"; Mobile Robots, Perception & Navigation; Published Feb. 1, 2007; 14 pgs.
Yuji Ito, et al.; "Contact State Estimation by Vision-Based Tactile Sensors for Dexterous Manipulation With Robot Hands Based on Shape-Sensing"; Int J Adv Robotic Sy, 2011, vol. 8, No. 4; pp. 225-234.
Yuji Ito, et al.; "Contact Region Estimation Based on a Vision-Based Tactile Sensor Using a Deformable Touchpad"; Sensors 2014, 14; Published Mar. 25, 2014; pp. 5805-5822.
Goro Obinata; "Acquisition of Contact Force and Slippage Using a Vision-Based Tactile Sensor With a Fluid-Type Touchpad for the Dexterous Handling of Robots"; Advances in Robotics and Automation; Jan. 2014; 10 pgs.
Go Otsuka, et al.; "Design and Characterization of a Plug-In Device for Tactile Sensing"; Science and Technology Publications; Proceedings of the 15th International Conference on Informatics in Controls, Automation and Robotics; 2018; pp. 488-493.
Norinao Watanabe, et al.; "Grip Force Control Using Vision-Basedtactile Sensor for Dexterous Handling"; European Robotics Symposium; 2008; STAR 44; pp. 113-122.
Yuji Ito, et al.; "Robust Slippage Degree Estimation Based on Reference Update of Vision-Based Tactile Sensor"; IEEE Sensors Journal; vol. 11, No. 9; Sep. 2011; pp. 2037-2047.

(56) References Cited

OTHER PUBLICATIONS

Yuji Ito, et al.; "Vision-Based Tactile Sensing and Shape Estimation Using a Fluid-Type Touchpad"; IEEE Transaction on Automation Science and Engineering; vol. 9, No. 4; Oct. 2012; pp. 734-744.
Junya Nakanishi, et al.; "On Agreement Between Tactile Sensing and Rendering"; Department of Robotics Science and Technology; 2019; 4 pgs.
Yuji Ito, et al.; "Shape Sensing by Vision-Based Tactile Sensor for Dexterous Handling of Robot Hands"; 6th Annual IEEE Conference of Automation Science and Engineering; Aug. 2010; pp. 574-579.
Yuji Ito, et al.; "Acquisition of Tactile Information by Vision-Based Tactile Sensor for Dexterous Handling of Robot Hands"; The 2010 IEEE/RSJ International Conference on Intelligent Robots and Systems; Oct. 2010; pp. 891-896.

\* cited by examiner

DEFORMABLE SENSORS AND METHODS FOR DETECTING POSE AND FORCE AGAINST AN OBJECT

CROSS-REFERENCE TO RELATED APPLICATIONS

This application is a continuation of U.S. application Ser. No. 17/243,664, filed Apr. 29, 2021, which is a continuation of U.S. application Ser. No. 16/864,874, filed May 1, 2020, which is a continuation of U.S. application Ser. No. 15/909,742, filed Mar. 1, 2018, which claims the benefit of U.S. Provisional Application 62/563,595, filed Sep. 26, 2017, which are incorporated by reference in their entireties.

TECHNICAL FIELD

Embodiments described herein generally relate to contact sensors and, more particularly, to deformable contact and geometry/pose sensors capable of detecting contact and a geometry of an object. Embodiments also relate to robots incorporating deformable contact and geometry sensors. Deformability may refer, for example, to ease of deformation of deformable sensors. Spatial resolution may refer, for example, to how many pixels a deformable sensor has. The number of pixels may range from 1 (e.g., a sensor that simply detects contact with a target object) to thousands or millions (e.g., the dense sensor provided by a time-of-flight sensor having thousands of pixels) or any suitable number. Deformability may refer to how easily a deformable membrane deforms when contacting a target object. A deformable sensor may be of a high spatial resolution, with a dense tactile sensing sensor that is provided as an end effector of a robot, thereby giving the robot a fine sense of touch like a human's fingers. A deformable sensor may also have a depth resolution to measure movement toward and away from the sensor.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors.

SUMMARY

In one embodiment, a deformable sensor for detecting a pose and force associated with an object includes an enclosure having a housing and a deformable membrane coupled to an upper portion of the housing, the enclosure configured to be filled with a medium. The deformable sensor may also include an internal sensor, disposed within the enclosure, having a field of view configured to be directed through the medium and toward a bottom surface of the deformable membrane, wherein the internal sensor is configured to output a deformation region within the deformable membrane as a result of contact with the object.

In another embodiment, a method for sensor-based detection of a pose and force associated with an object includes receiving, by a processor, a signal from a deformable sensor comprising data with respect to a deformation region in a deformable membrane that may result from contact with the object utilizing an internal sensor disposed within an enclosure and having a field of view directed through a medium and toward a bottom surface of the deformable membrane. A pose of the object may be determined, by the processor, based on the deformation region of the deformable membrane. An amount of force applied between the deformable membrane and the object may be determined, by the processor, based on the deformation region of the deformable membrane.

In yet another embodiment, a system for detecting a pose and force associated with an object may include an enclosure comprising a housing and a deformable membrane coupled to an upper portion of the housing, the enclosure configured to be filled with a medium. The system may also include an internal sensor, disposed within the enclosure, having a field of view configured to be directed through the medium and toward a bottom surface of the deformable membrane. The internal sensor may output a deformation region within the deformable membrane as a result of contact with the object. The system may further include a processor that determines a pose of the object and an amount of force applied between the deformable membrane and the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects.

Embodiments of the present disclosure are directed to deformable/compliant contact and/or geometry sensors (hereinafter "deformable sensors") that not only detect contact with a target object, but also detect the geometry, pose and contact force of the target object. Particularly, the deformable sensors described herein comprise a deformable membrane coupled to a housing that maintains a sensor capable of detecting displacement of the deformable membrane by contact with an object. The deformable sensors described herein not only detect the pressure or force that is applied to the deformable membrane, but can also detect the geometry and pose of the object. Thus, the deformable sensors described herein provide a robot (or other device) with a sense of touch when manipulating objects.

Figure 1:
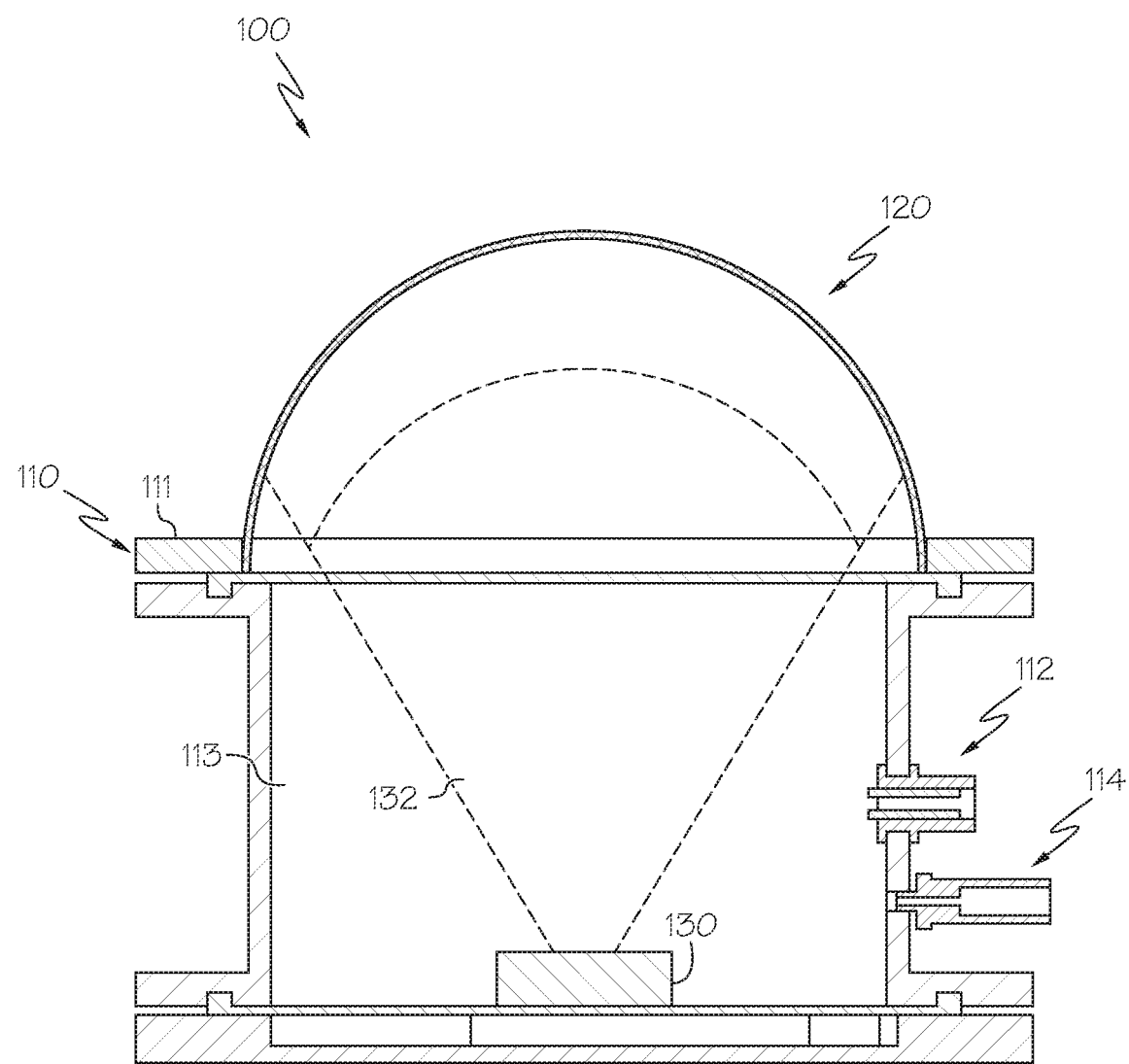
FIG. 1 schematically depicts an elevation view of an example deformable sensor according to one or more embodiments described and illustrated herein.
Figure 2:
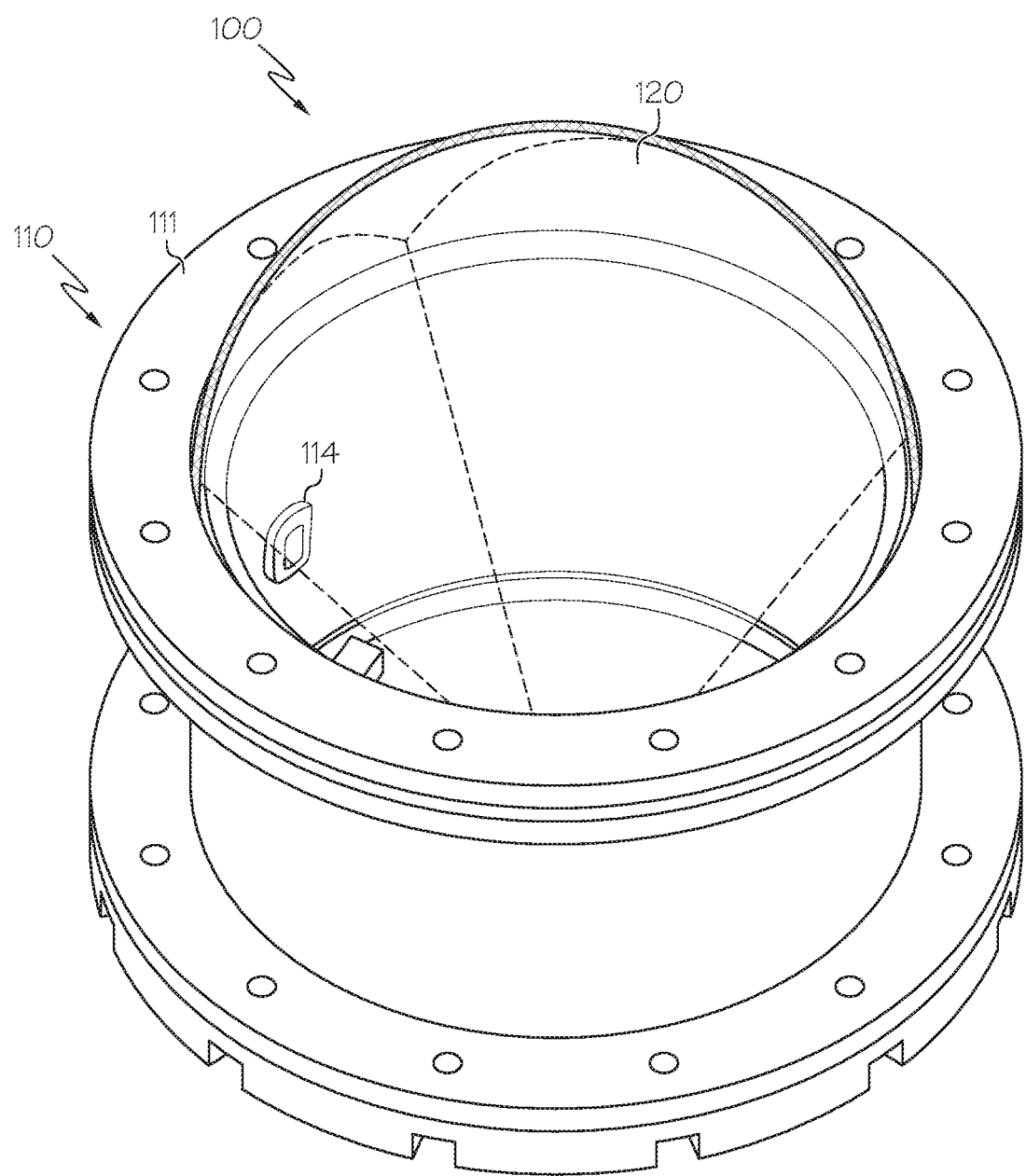
FIG. 2 schematically depicts a top perspective view of the example deformable sensor depicted by FIG. 1 according to one or more embodiments described and illustrated herein.

Referring now to FIGS. 1 and 2, an example deformable sensor 100 is schematically illustrated. FIG. 1 is a front elevation view of the example deformable sensor 100 and FIG. 2 is a top perspective view of the example deformable sensor 100. FIGS. 1 and 2 depict differing embodiments. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other rubber-like substance. In some embodiments a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments robots feature varying touch sensitivity due to varying spatial resolution and/or depth resolution.

Figure 3:
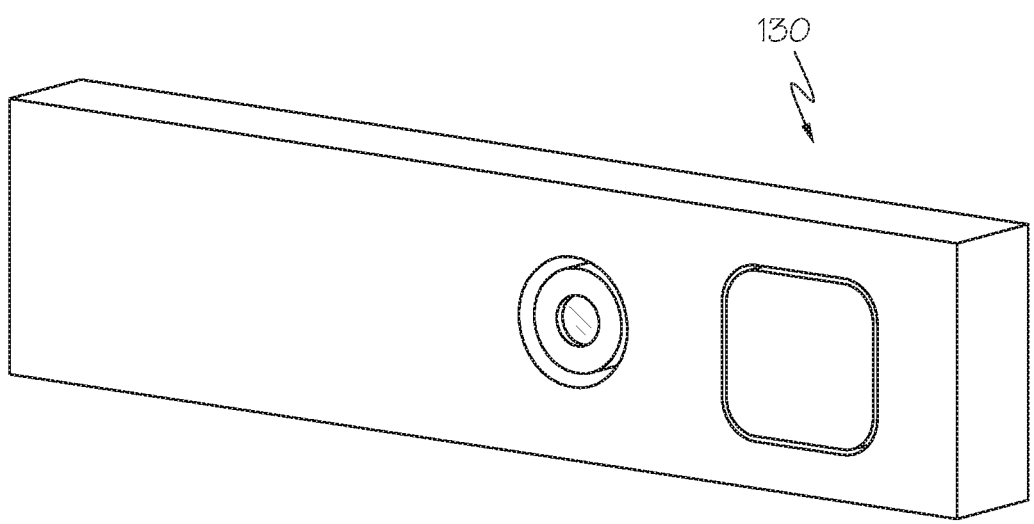
FIG. 3 schematically depicts an example time-of-flight sensor for use in a deformable sensor according to one or more embodiments described and illustrated herein.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In others, a sensitive time-of-flight sensor such may be used as a high spatial resolution internal sensor 130 that provides dense tactile sensing. Thus, the internal sensor 130 may be modular because the sensors may be changed depending on the application. FIG. 3 depicts an example time-of-flight sensor. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3d scanners, single cameras (such as with dots or other patterns inside), or any other suitable type of visual detector. For example, the internal sensor 130 may be configured as a stereo-camera capable of detecting deflections of the deformable membrane 120 by an object.

Any suitable quantity and/or types of internal sensors 130 may be utilized within a single deformable sensor 100 in some embodiments. In some examples, not all internal sensors 130 within a deformable sensor 100 need be of the same type. In various embodiments, one deformable sensor 100 may utilize a single internal sensor 130 with a high spatial resolution, whereas another deformable sensor 100 may use a plurality of internal sensors 130 that each have a low spatial resolution. In some embodiments the spatial resolution of a deformable sensor 100 may be increased due to an increase in the quantity of internal sensors 130. In some examples, a decrease in the number of internal sensors 130 within a deformable sensor 100 can be compensated for by a corresponding increase in the spatial resolution of at least some of the remaining internal sensors 130. As discussed in more detail below, the aggregate deformation resolution may be measured as a function of the deformation resolution or depth resolution among the deformable sensors 100 in a portion of a robot. In some embodiments aggregate deformation resolution may be based upon a quantity of deformable sensors in a portion of the robot and a deformation resolution obtained from each deformable sensor in that portion.

Referring again to FIG. 1, a conduit 114 may be utilized in the enclosure 113 to provide power and/or data/signals, such as to the internal sensor 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless internal sensors 130 to transmit and/or receive data and/or power. In various embodiments where the medium is not a gas, such as silicone, the enclosure 113 and/or conduit 114 may not necessarily be airtight.

In some embodiments the internal sensor 130 may include one or more internal pressure sensors (barometers, pressure sensors, etc., or any combination thereof) utilized to detect the general deformation of the deformable membrane 120 through the medium. In some embodiments the deformable sensor 100 and/or internal sensor 130 may receive/send various data, such as through the conduit 114 discussed above, wireless data transmission (wi-fi, Bluetooth, etc.), or any other suitable data communication protocol. For example, pressure within a deformable sensor 100 may be specified by a pressurization parameter and may be inversely proportional to the deformability of the deformable sensor 100. In some embodiments the deformability of a deformable sensor 100 may be modified by changing pressure within the enclosure 113 or a material of the deformable membrane 120. In some embodiments receipt of an updated parameter value may result in a real-time or delayed update (pressurization, etc.).

Figure 4:
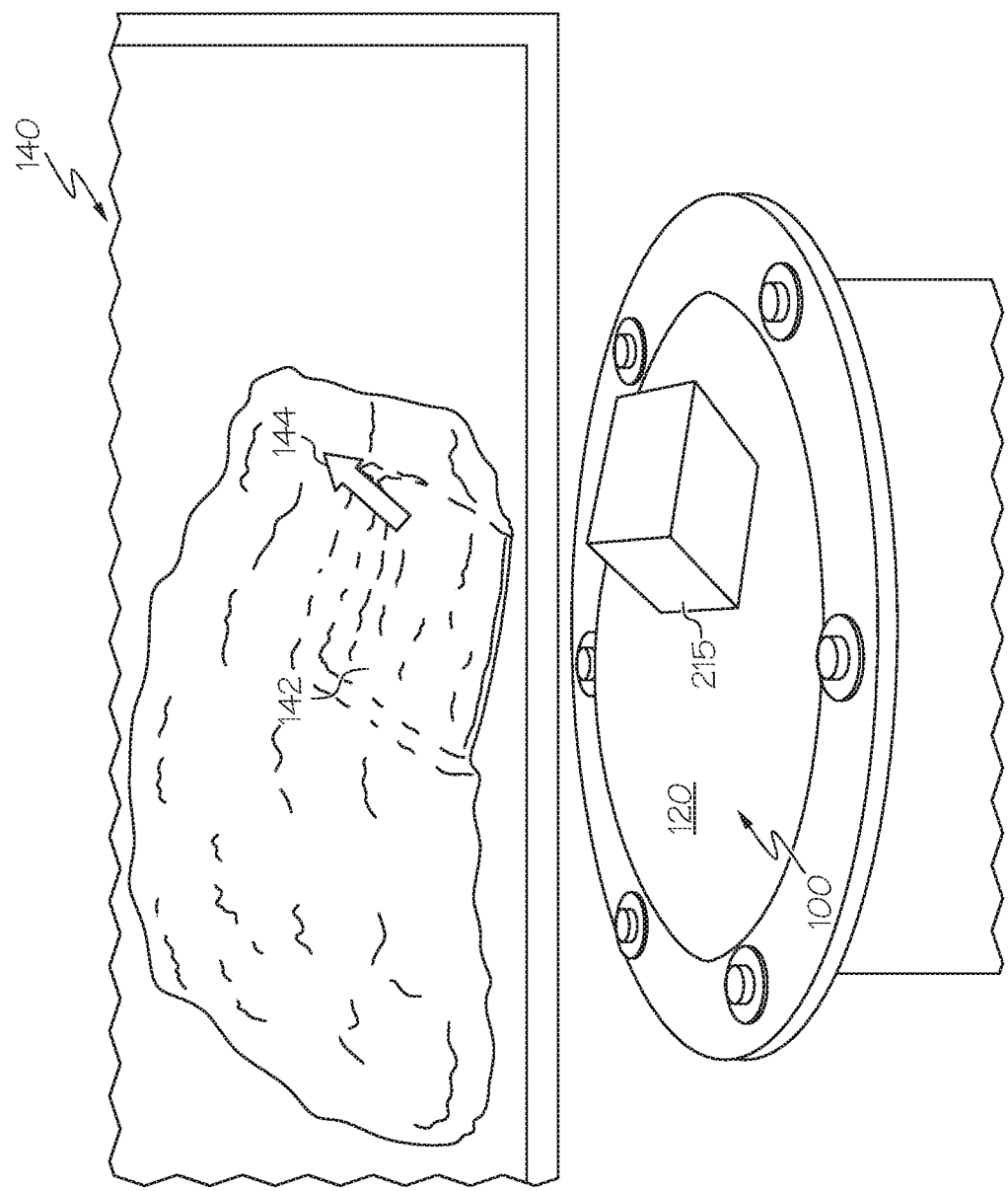
FIG. 4 is an image depicting an output of a deformable sensor on an electronic display according to one or more embodiments described and illustrated herein.

FIG. 4 depicts an image of an example object 215 displacing the deformable membrane 120 of the example deformable sensor 100. In the illustrated embodiment, a display device 140 outputs for display on a device, output of the deformable sensor 100 in real time as an object 215 contacts and/or deforms the deformable membrane 120. It should be understood that the display device 140 is provided for illustrative purposes only, and that embodiments may be utilized without a display device. As the object 215 is pressed into the deformable membrane 120, the object 215 imparts its shape into the deformable membrane 120 such that the deformable membrane 120 conforms to the shape of the object 215. The spatial resolution of the internal sensor 130 may be such that the internal sensor 130 detects the geometry and/or pose of the displaced deformable membrane 120. For example, when the internal sensor 130 is a time-of-flight sensor, the optical signal that is reflected off of the bottom surface of the deformable membrane 120 that is being deflected by the object has a shorter time-of-flight than the optical signal that is reflected by the deformable membrane 120 at a region outside of the deflected region. Thus, a contact region 142 (or displaced region, used herein interchangeably) having a geometry and/or pose matching the shape of the object 215 may be outputted and displayed on the display device 140.

The deformable sensor 100 therefore not only may detect the presence of contact with the object 215, but also the geometry of the object 215. In this manner, a robot equipped with a deformable sensor 100 may determine the geometry of an object based on contact with the object. Additionally, a geometry and/or pose of the object 215 may also be determined based on the geometric information sensed by the deformable sensor 100. For example, a vector 144 that is normal to a surface in the contact region 142 may be displayed, such as when determining the pose of the object 215. The vector 144 may be used by a robot or other device to determine which direction a particular object 215 may be oriented, for example.

Figure 5:
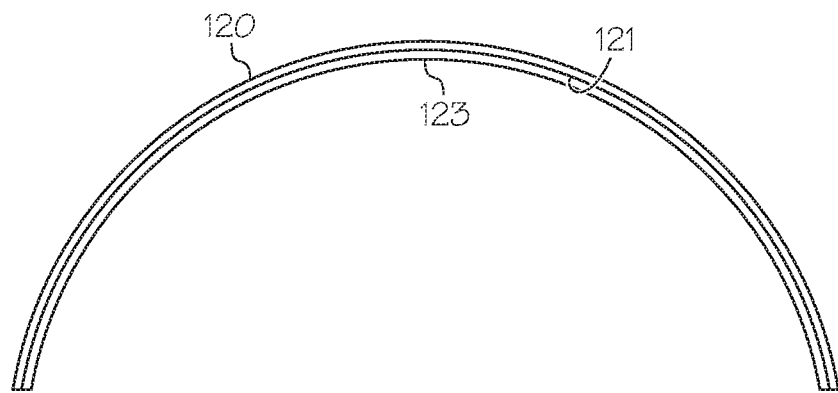
FIG. 5 schematically depicts a filter layer coupled to a deformable membrane of a deformable sensor according to one or more embodiments described and illustrated herein.

Referring now to FIG. 5, in some embodiments an optional filter layer 123 may be disposed on a bottom surface 121 of the deformable membrane 120. As described in more detail below and shown in FIG. 7, the bottom surface 121 of the deformable membrane 120 may be patterned (e.g., a grid pattern 122, a dot pattern, or any other suitable type pattern) that may be detected, by way of non-limiting example, a stereo-camera to detect displacement. The filter layer 123 may be configured to aid the internal sensor 130 in detecting deformation of the deformable membrane 120. In some embodiments, the filter layer 123 reduces glare or improper reflections of one or more optical signals emitted by the internal sensor 130. In some embodiments the filter layer 123 may scatter one or more optical signals emitted by the internal sensor 130. The filter layer 123 may be an additional layer secured to the bottom surface 121 of the deformable membrane 120, or it may be a coating and/or pattern applied to the bottom surface 121 of the deformable membrane 120.

Figure 6:
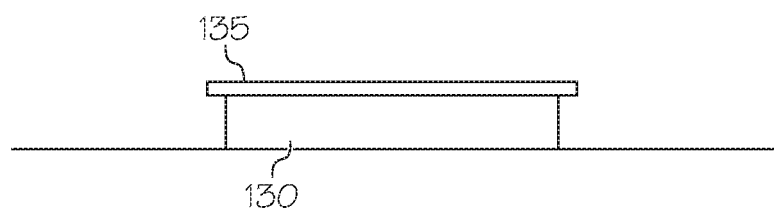
FIG. 6 schematically depicts a filter within a field of view of a sensor of a deformable sensor according to one or more embodiments described and illustrated herein.

Referring to FIG. 6, in some embodiments an internal sensor filter 135 may be disposed within the field of view 132 of the internal sensor 130. The internal sensor filter 135 may optimize the optical signal emitted by the internal sensor 130 for reflection upon the bottom surface 121 of the deformable membrane 120. Like the filter layer 123, the internal sensor filter 135 may be disposed within a field of view 132 of the internal sensor 130 and may reduce glare or improper reflections of any optical signals emitted by the internal sensor 130. In some embodiments the internal sensor filter 135 may scatter one or more optical signals emitted by the internal sensor 130. In some embodiments, both the internal sensor filter 135 and the filter layer 123 may be utilized.

Figure 7:
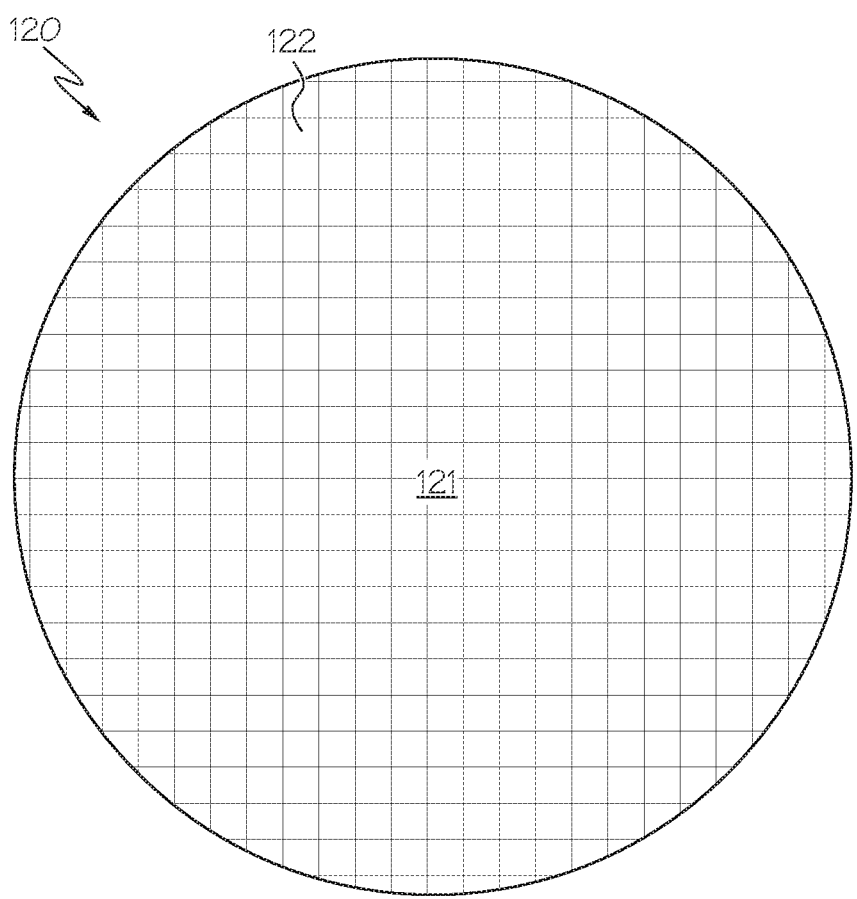
FIG. 7 schematically depicts a pattern on a bottom surface of a deformable membrane of a deformable sensor according to one or more embodiments described and illustrated herein.

Referring now to FIG. 7, a grid pattern 122 may be applied to a bottom surface 121 of the deformable membrane 120 to assist in the detection of the deformation of the deformable membrane 120. For example, the grid pattern 122 may assist in the detection of the deformation when the internal sensor 130 is a stereo-camera. For example, varying degrees of distortion to the grid pattern 122 may be utilized to discern how much deformation has occurred. In this example, the distance between parallel lines and/or measuring curvature of lines in the grid pattern 122 may be used to determine the amount of deformation at each point in the grid. It should be understood that embodiments are not limited to grid patterns, as other types of patterns are possible, such as dots, shapes, and the like. The pattern on the bottom surface 121 may be random, and not necessarily arranged in a grid pattern 122 or an array as shown in FIG. 7.

Figure 8:
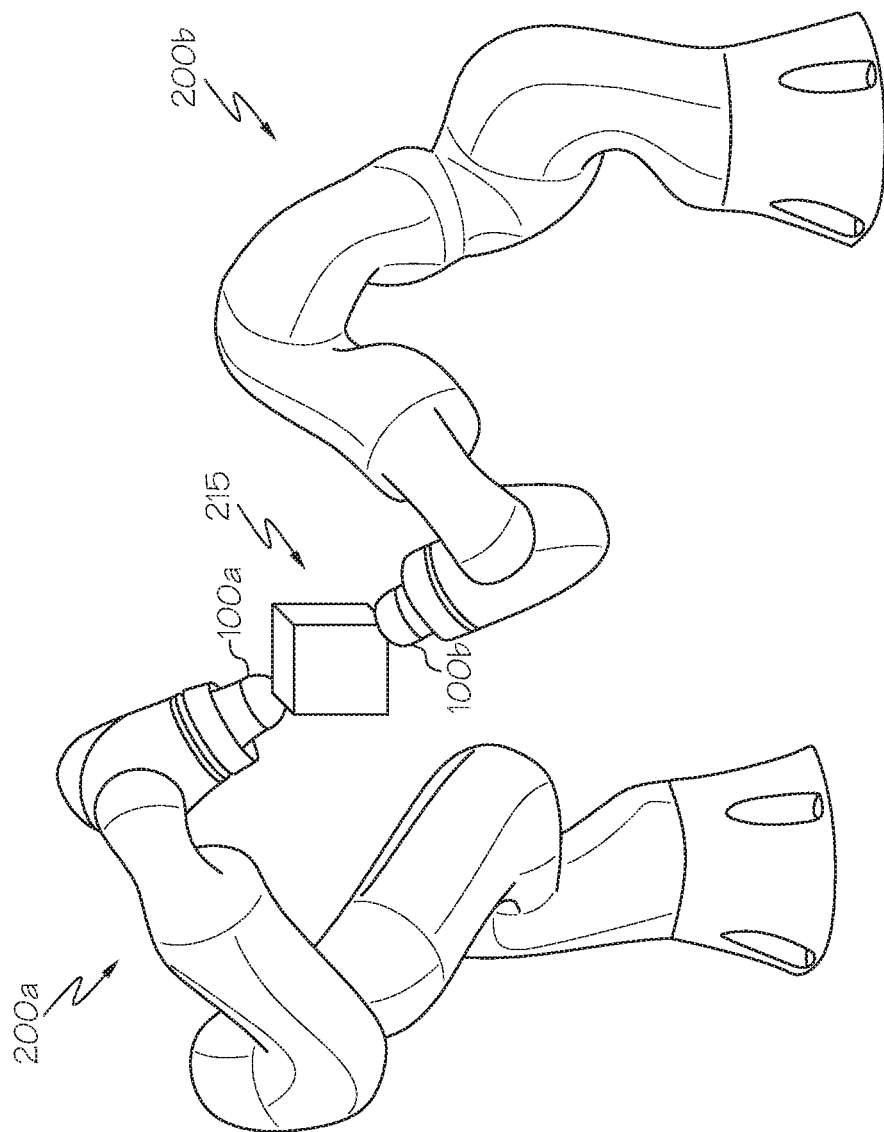
FIG. 8 schematically depicts two example robots each having a deformable sensor and manipulating an object according to one or more embodiments described and illustrated herein.

FIG. 8 schematically depicts an example non-limiting first robot 200a having a first deformable sensor 100a and an example second robot 200b having a second deformable sensor 100b. In this illustrated example, the first robot 200A and the second robot 200B may cooperate for dual arm manipulation wherein both the first deformable sensor 100A and the second deformable sensor 100b contact the object 215. As stated above, the deformable sensors 100 described herein may be used as an end effector of a robot to manipulate an object. The deformable sensor 100 may allow a robot to handle an object 215 that is fragile due to the flexible nature of the deformable membrane 120. Further, the deformable sensor 100 may be useful for robot-to-human contact because in some embodiments the deformable membrane 120 may be softer and/or more flexible/deformable, rather than rigid (non-deformable or nearly so) to the touch.

In addition to geometry and pose estimation, the deformable sensor 100 may be used to determine how much force a robot 200a (or other device) is exerting on the target object 215. Although reference is made to first robot 200a, any such references may in some embodiments utilize second robot 200b, any other suitable devices, and/or any combinations thereof. This information may be used by the robot 200a to more accurately grasp objects 215. For example, the displacement of the deformable membrane 120 may be modeled. The model of the displacement of the deformable membrane 120 may be used to determine how much force is being applied to the target object 215. The determined force as measured by the displacement of the deformable membrane 120 may then be used to control a robot 200a to more accurately grasp objects 215. As an example, the amount of force a robot 200a (discussed in more detail below) applies to a fragile object 215 may be of importance so that the robot 200a does not break the object 215 that is fragile. In some embodiments an object 215 may be assigned a softness value (or fragility value), where the robot 200a may programmed to interact with all objects 215 based upon the softness value (which may be received at a processor, for example, from a database, server, user input, etc.). In some embodiments a user interface may be provided to specify any suitable value (pressure within the deformable sensor 100 FIG. 1, softness value pertaining to an object 215, etc.) for initialization and/or updating (such as on a display device depicted in 140 FIG. 4, 1204 FIG. 12, etc.). In other embodiments a robot 200a may be able to identify specific objects 215 (such as via object recognition in a vision system, etc.) whereby the softness value may be modified, which may lead to utilization of another deformable sensor 100 having a more suitable deformability, aggregate spatial resolution, depth resolution, pressure, and/or material for the deformable membrane 120. In some embodiments a processor in a robot 200a may from the internal sensor 130 receive data representing the contact region 142. In various embodiments a processor in a robot 200a may determine a vector 144 normal to a surface of the object 215 based on the data representing the contact region 142 and utilize the vector 144 to determine which direction the object 215 is oriented.

Figure 9:
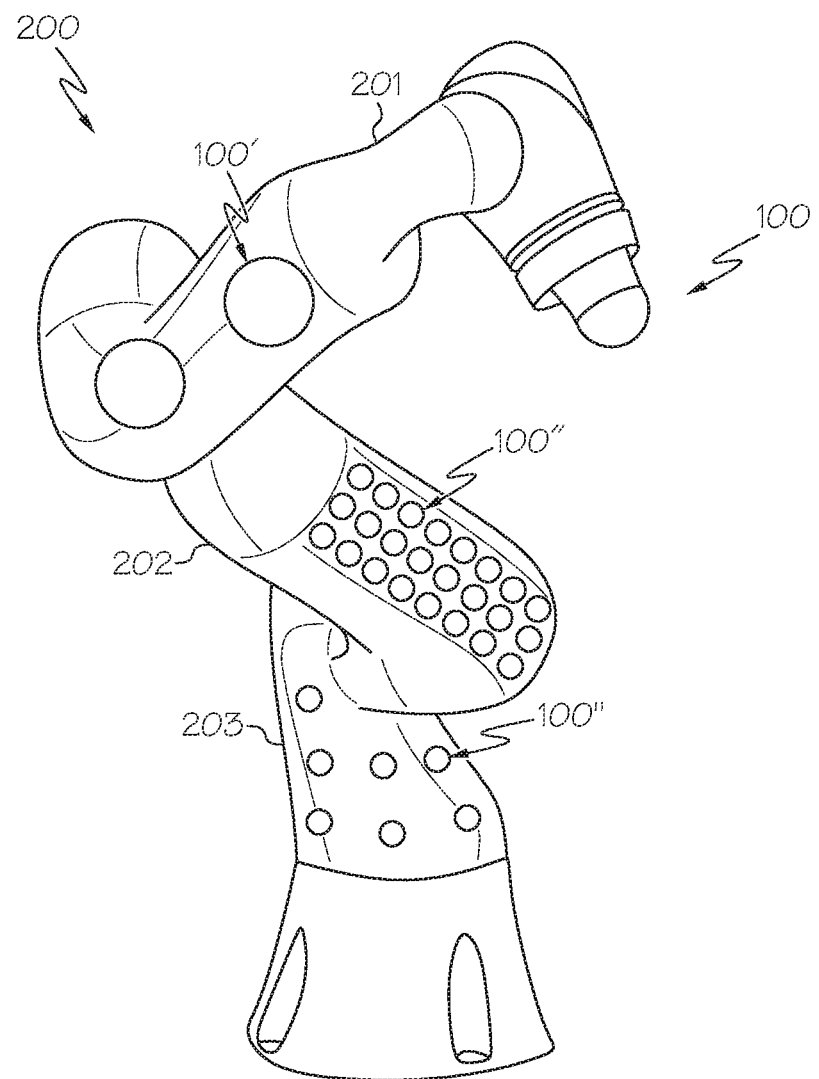
FIG. 9 schematically depicts an example robot having a plurality of deformable sensors with varying spatial resolution and depth resolution according to one or more embodiments described and illustrated herein.

In embodiments, a plurality of deformable sensors may be provided at various locations on a robot 200. FIG. 9 depicts an example robot 200 having a plurality of deformable sensors 100, 100' and 100" at different locations. A deformable sensor 100 may act as an end effector of the robot 200, and have a high spatial resolution and/or depth resolution. In some embodiments the deformability of a deformable sensor 100 may be a function of some combination of the material of the deformable membrane 120 and the internal pressure within the deformable sensor 100. In some embodiments a deformable sensor 100 may have a clamp or other suitable attachment mechanism. For example, the deformable sensor 100 may be removably attached to a robot 200, and/or a robot 200 which may have features to provide for attachment and/or removal of a deformable sensor 100. Any suitable type of clamp, fastener, or attachment mechanism may be utilized in some embodiments.

Each deformable sensor 100 may have a desired spatial resolution and/or a desired depth resolution depending on its location on the robot 200. In the illustrated embodiment, deformable sensors 100' are disposed on a first arm portion 201 and a second arm portion 202 (the terms "arm portion" and "portion" being used interchangeably throughout). An arm portion may have one or more deformable sensors 100, or none at all. The deformable sensors 100' may be shaped to conform to the shape of the first arm portion 201 and/or the second arm portion 202. It may be noted that the deformable sensors 100 described herein may take on any shape depending on the application. Deformable sensors 100' may be very flexible and thus deformable. This may be beneficial in human-robot interactions. In this way, the robot 200 may contact a person (e.g., to give the person a "hug") without causing harm due to the softness of the deformable sensors 100' and/or due to an ability to control the force of the contact with an object. The spatial resolution of one or more deformation sensors 100' in the arm portions 201, 202 may be high or low depending on the application. In the example of FIG. 9, the deformable sensors 100" near the base portion 203 of the robot 200 may have low spatial resolution, and may be configured to only detect contact with a target object. The deformability of deformable sensors 100" near the base of the robot 200 may be set based on the application of the robot 200. The depth resolution and/or spatial resolution of the sensors 100 may be varied along different parts of the robot 200. For example, one portion 203 it may not be necessary to identify the shape and/or pose of an object coming into contact with a particular deformable sensor 100, as simply registering contact with an object may provide sufficient information, whereas contact with another portion (such as 201) may produce pose and/or shape information derived from the contact. As shown in FIG. 9, deformable sensors 100 may be of any suitable size, which may vary even within an arm portion. Although arm portions 201, 202, 203 are depicted as being discrete/non-overlapping, overlap may occur in other embodiments.

As discussed above, a portion of a robot 200 may provide an aggregate spatial resolution that is greater than another portion. In some embodiments a portion of a first robot 200a may interact with an object 215 in simultaneous coordination with a portion of second robot 200b, and the aggregate spatial resolution of the portion of the first robot 200a may equal the spatial resolution of the portion of the second robot 200b. In some embodiments deformability, such as in a portion of a robot 200a, may be determined and/or modified based upon a softness value of one or more objects 215 with which the portion interacts. In various embodiments the aggregate spatial resolution of the portion may differ from the aggregate spatial resolution of another portion based upon both portions being configured to interact with a plurality of objects 215 having differing softness values. In some embodiments modifying the aggregate spatial resolution of the portion may be based upon adjusting a quantity of deformable membranes 120, a quantity of internal sensors 130 within one or more deformable membranes 120, and/or a spatial resolution of at least one internal sensor 130. In some embodiments, various portions may work in tandem. For example, as discussed above, one portion may utilize a high spatial resolution to determine an object's pose/shape and/or a pattern on the surface on the object, while another portion (on the same or a different robot) may only detect the location of contact, where these portions may communicate with each other or with another component that receives information from both portions.

Figure 10:
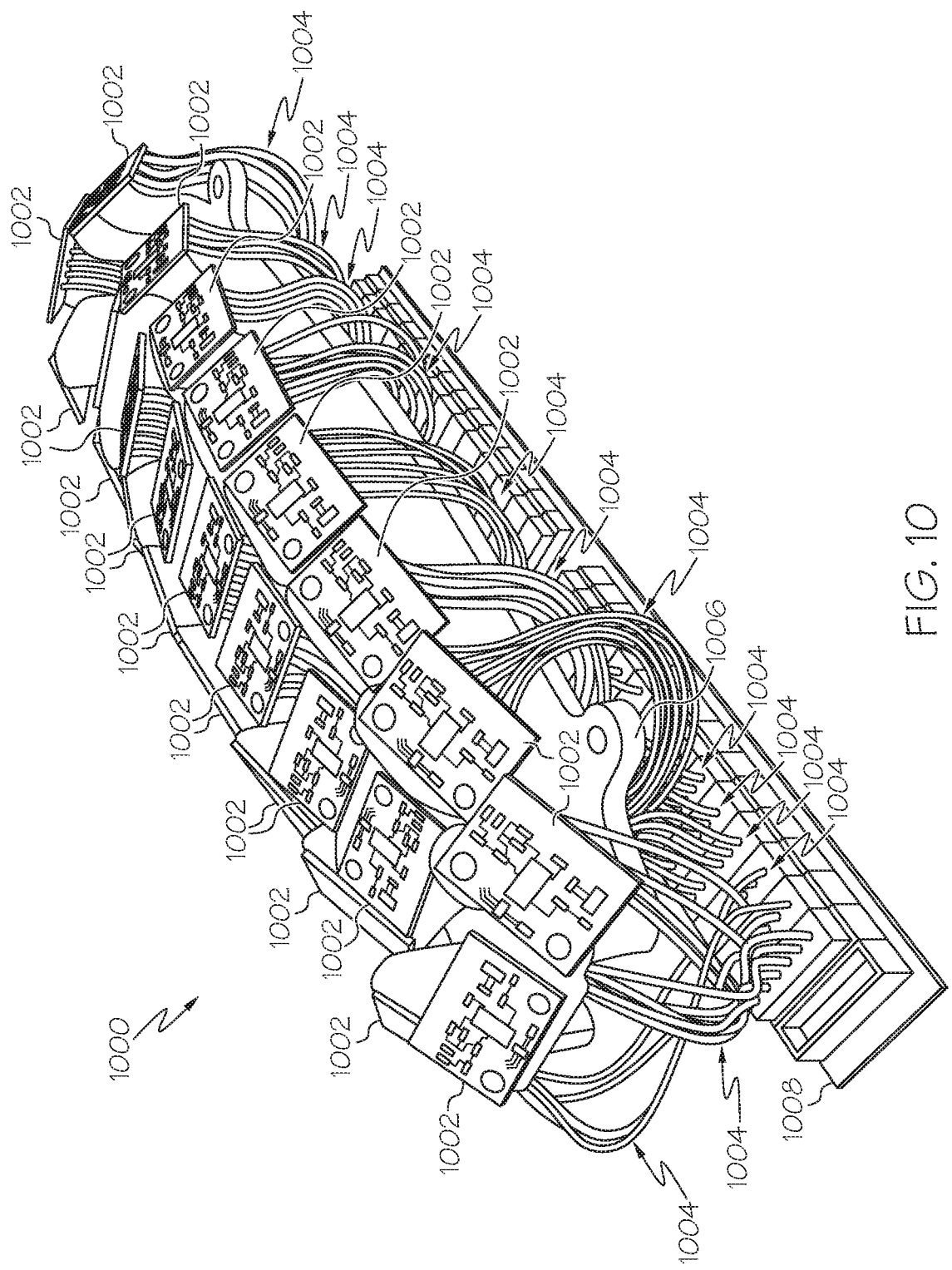
FIG. 10 schematically depicts a compound internal sensor having a plurality of internal sensors according to one or more embodiments described and illustrated herein.

Referring now to FIG. 10, an embodiment depicts a compound internal sensor 1000, which may be utilized within a deformable sensor (not shown). A plurality of internal sensors 1002 are depicted, which in this embodiment are time-of-flight cameras (as discussed above in FIG. 3). Other embodiments may utilize any combination of various types of internal sensors. In this embodiment cables 1004 are utilized to provide data communications and/or power to the internal sensors, although other embodiments may use a different number of cables and/or wireless connections for data and/or power. A support structure 1006 is depicted in this embodiment, although other embodiments may utilize a plurality of support structures or no support structure. In this embodiment the support structure is rigid, although one or more support structures may be flexible to change the orientation of internal sensors 1002 in some embodiments. In this embodiment the cables 1004 may be connected to a base portion 1008 for data communications and/or power.

Figure 11:
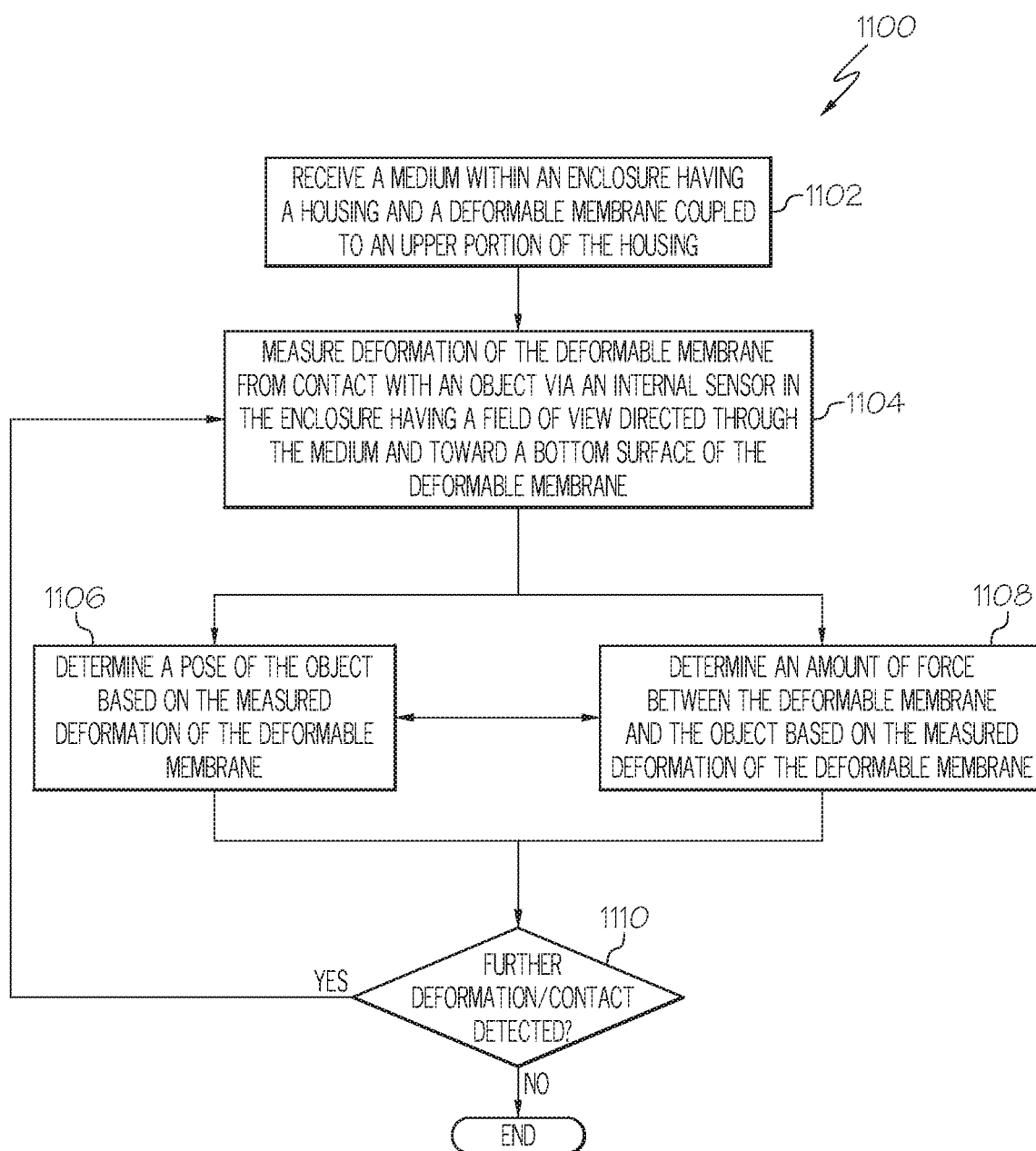
FIG. 11 is a flow chart depicting an exemplary process of determining the pose and force associated with an object in contact with a deformable sensor according to one or more embodiments described and illustrated herein.

Turning now to FIG. 11, a flowchart 1100 illustrates an exemplary process for determining the pose and force associated with an object in contact with a deformable sensor. At block 1102, a medium (gas, liquid, silicone, etc.) may be received within the enclosure 113 having a housing 110 where the deformable membrane 120 is coupled to an upper portion 111 of the housing 110. At block 1104, deformation of the deformable membrane 120 may be measured based on contact with an object 215 via an internal sensor 130 in the enclosure 113 having a field of view 132 directed through the medium and toward a bottom surface 121 of the deformable membrane 120. At block 1106, a pose of the object 215 may be determined based on the measure deformation (such as the contact region 142) of the deformable membrane 120. At block 1108, an amount of force between the deformable membrane 120 and the object 215 is determined based on the measured deformation of the deformable membrane 120. Blocks 1106 and 1108 may be performed simultaneously, but do not necessarily need to be. At block 1110 a determination is made as to whether further deformation and/or contact is detected. If so, then the flowchart may return to block 1104. If not, the flowchart may end.

Figure 12:
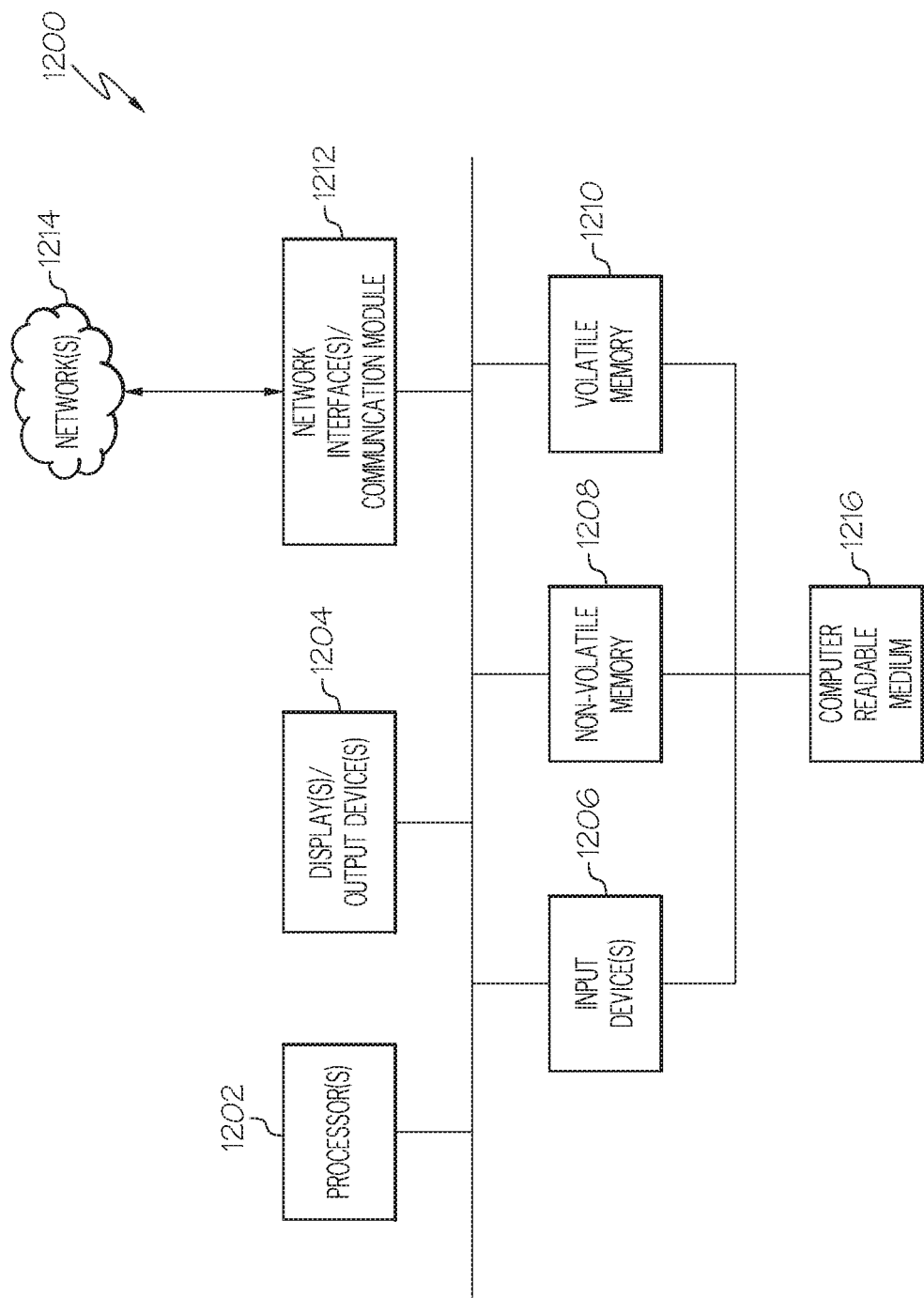
FIG. 12 is a block diagram illustrating computing hardware utilized in one or more devices for implementing various processes and systems, according one or more embodiments described and illustrated herein.

Turning to FIG. 12, a block diagram illustrates an example of a computing device 1200, through which embodiments of the disclosure can be implemented, such as (by way of non-limiting example) a deformable sensor 100, an internal sensor 130, a robot 200, or any other device described herein. The computing device 1200 described herein is but one example of a suitable computing device and does not suggest any limitation on the scope of any embodiments presented. Nothing illustrated or described with respect to the computing device 1200 should be interpreted as being required or as creating any type of dependency with respect to any element or plurality of elements. In various embodiments, a computing device 1200 may include, but need not be limited to, a deformable sensor 100, an internal sensor 130, a robot 200. In an embodiment, the computing device 1200 includes at least one processor 1202 and memory (non-volatile memory 1208 and/or volatile memory 1210). The computing device 1200 can include one or more displays and/or output devices 1204 such as monitors, speakers, headphones, projectors, wearable-displays, holographic displays, and/or printers, for example. The computing device 1200 may further include one or more input devices 1206 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 1200 may include non-volatile memory 1208 (ROM, flash memory, etc.), volatile memory 1210 (RAM, etc.), or a combination thereof. A network interface 1212 can facilitate communications over a network 1214 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1212 can be communicatively coupled to any device capable of transmitting and/or receiving data via the network 1214. Accordingly, the hardware of the network interface 1212 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 1216 may comprise a plurality of computer readable mediums, each of which may be either a computer readable storage medium or a computer readable signal medium. A computer readable storage medium 1216 may reside, for example, within an input device 1206, non-volatile memory 1208, volatile memory 1210, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a robot 200 and/or a server may utilize a computer readable storage medium to store data received from one or more internal sensors 130 on the robot 200.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1200, such as a deformable sensor 100, an internal sensor 130, a robot 200, may include one or more network interfaces 1212 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot 200. A network interface 1212 may also be described as a communications module, as these terms may be used interchangeably.

Figure 13:
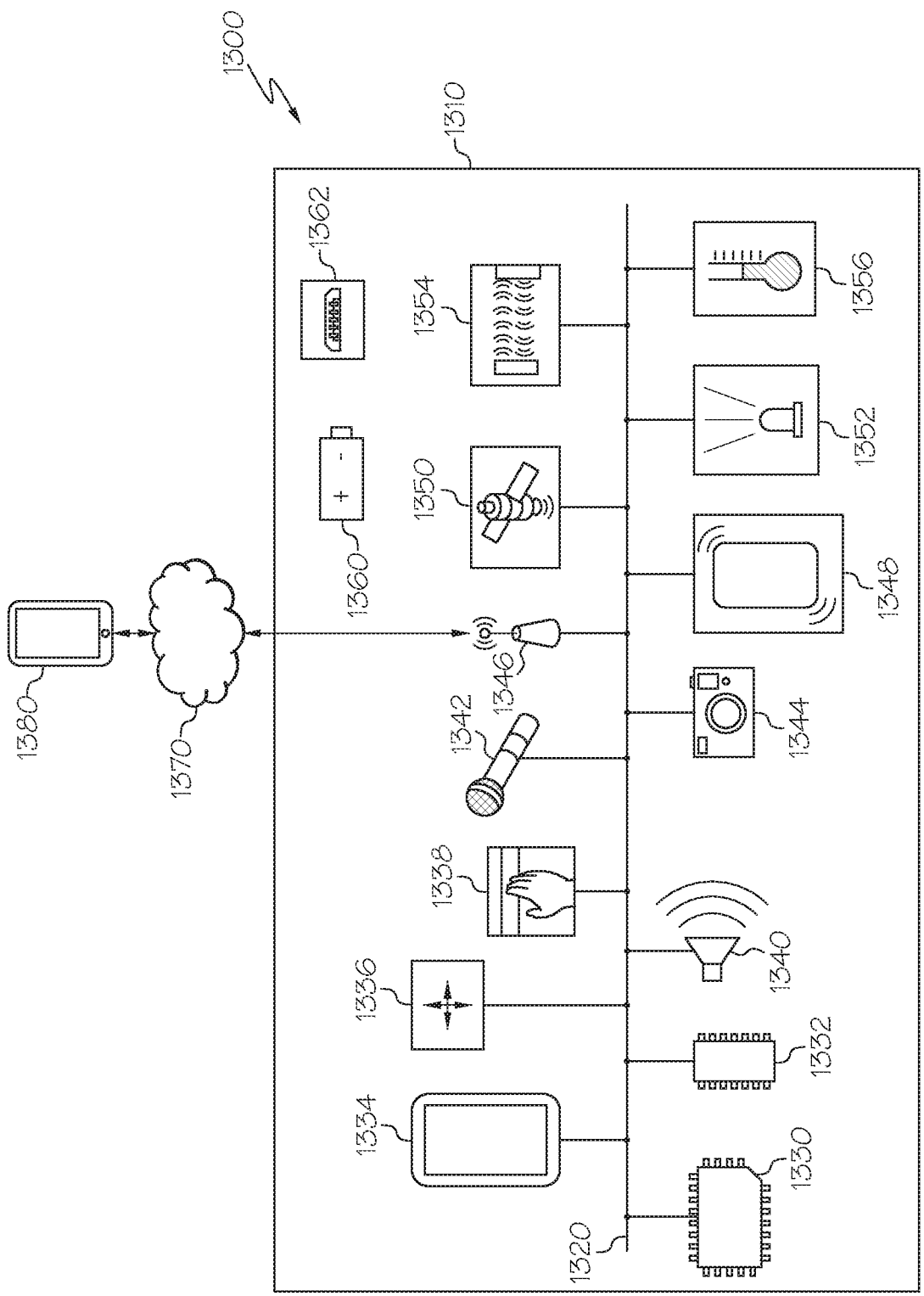
FIG. 13 is a block diagram illustrating hardware utilized in one or more robots for implementing various processes and systems, according one or more embodiments described and illustrated herein.

Turning now to FIG. 13, example components of one non-limiting embodiment of a robot 1300 is schematically depicted. The robot 1300 includes a housing 1310, a communication path 1328, a processor 1330, a memory module 1332, a tactile display 1334, an inertial measurement unit 1336, an input device 1338, an audio output device 1340 (e.g., a speaker), a microphone 1342, a camera 1344, network interface hardware 1346, a tactile feedback device 1348, a location sensor 1350, a light 1352, a proximity sensor 1354, a temperature sensor 1356, a motorized wheel assembly 1358, a battery 1360, and a charging port 1362. The components of the robot 1300 other than the housing 1310 may be contained within or mounted to the housing 1310. The various components of the robot 1300 and the interaction thereof will be described in detail below.

Still referring to FIG. 13, the communication path 1328 may be formed from any medium that is capable of transmitting a signal such as, for example, conductive wires, conductive traces, optical waveguides, or the like. Moreover, the communication path 1328 may be formed from a combination of mediums capable of transmitting signals. In one embodiment, the communication path 1328 comprises a combination of conductive traces, conductive wires, connectors, and buses that cooperate to permit the transmission of electrical data signals to components such as processors, memories, sensors, input devices, output devices, and communication devices. Accordingly, the communication path 1328 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 1328 communicatively couples the various components of the robot 1300. As used herein, the term "communicatively coupled" means that coupled components are capable of exchanging data signals with one another such as, for example, electrical signals via conductive medium, electromagnetic signals via air, optical signals via optical waveguides, and the like.

The processor 1330 of the robot 1300 may be any device capable of executing machine-readable instructions. Accordingly, the processor 1330 may be a controller, an integrated circuit, a microchip, a computer, or any other computing device. The processor 1330 may be communicatively coupled to the other components of the robot 1300 by the communication path 1328. This may, in various embodiments, allow the processor 1330 to receive data from the one or more deformable sensors 100 which may be part of the robot 1300. In other embodiments, the processor 1330 may receive data directly from one or more internal sensors 130 which are part of one or more deformable sensors 100 on a robot 1300. Accordingly, the communication path 1328 may communicatively couple any number of processors with one another, and allow the components coupled to the communication path 1328 to operate in a distributed computing environment. Specifically, each of the components may operate as a node that may send and/or receive data. While the embodiment depicted in FIG. 13 includes a single processor 1330, other embodiments may include more than one processor.

Still referring to FIG. 13, the memory module 1332 of the robot 1300 is coupled to the communication path 1328 and communicatively coupled to the processor 1330. The memory module 1332 may, for example, contain instructions to detect a shape of an object that has deformed the deformable membrane 120 of a deformable sensor 100. In this example, these instructions stored in the memory module 1332, when executed by the processor 1330, may allow for the determination of the shape of an object based on the observed deformation of the deformable membrane 120. The memory module 1332 may comprise RAM, ROM, flash memories, hard drives, or any non-transitory memory device capable of storing machine-readable instructions such that the machine-readable instructions can be accessed and executed by the processor 1330. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 1332. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 13 includes a single memory module 1332, other embodiments may include more than one memory module.

The tactile display 1334, if provided, is coupled to the communication path 1328 and communicatively coupled to the processor 1330. The tactile display 1334 may be any device capable of providing tactile output in the form of refreshable tactile messages. A tactile message conveys information to a user by touch. For example, a tactile message may be in the form of a tactile writing system, such as Braille. A tactile message may also be in the form of any shape, such as the shape of an object detected in the environment. The tactile display 1334 may provide information to the user regarding the operational state of the robot 1300.

Any known or yet-to-be-developed tactile display may be used. In some embodiments, the tactile display 1334 is a three dimensional tactile display including a surface, portions of which may raise to communicate information. The raised portions may be actuated mechanically in some embodiments (e.g., mechanically raised and lowered pins). The tactile display 1334 may also be fluidly actuated, or it may be configured as an electrovibration tactile display.

The inertial measurement unit 1336, if provided, is coupled to the communication path 1328 and communicatively coupled to the processor 1330. The inertial measurement unit 1336 may include one or more accelerometers and one or more gyroscopes. The inertial measurement unit 1336 transforms sensed physical movement of the robot 1300 into a signal indicative of an orientation, a rotation, a velocity, or an acceleration of the robot 1300. The operation of the robot 1300 may depend on an orientation of the robot 1300 (e.g., whether the robot 1300 is horizontal, tilted, and the like). Some embodiments of the robot 1300 may not include the inertial measurement unit 1336, such as embodiments that include an accelerometer but not a gyroscope, embodiments that include a gyroscope but not an accelerometer, or embodiments that include neither an accelerometer nor a gyroscope.

Still referring to FIG. 13, one or more input devices 1338 are coupled to the communication path 1328 and communicatively coupled to the processor 1330. The input device 1338 may be any device capable of transforming user contact into a data signal that can be transmitted over the communication path 1328 such as, for example, a button, a switch, a knob, a microphone or the like. In various embodiments an input device 1338 may be a deformable sensor 100 and/or an internal sensor 130 as described above. In some embodiments, the input device 1338 includes a power button, a volume button, an activation button, a scroll button, or the like. The one or more input devices 1338 may be provided so that the user may interact with the robot 1300, such as to navigate menus, make selections, set preferences, and other functionality described herein. In some embodiments, the input device 1338 includes a pressure sensor, a touch-sensitive region, a pressure strip, or the like. It should be understood that some embodiments may not include the input device 1338. As described in more detail below, embodiments of the robot 1300 may include multiple input devices disposed on any surface of the housing 1310. In some embodiments, one or more of the input devices 1338 are configured as a fingerprint sensor for unlocking the robot. For example, only a user with a registered fingerprint may unlock and use the robot 1300.

The speaker 1340 (i.e., an audio output device) is coupled to the communication path 1328 and communicatively coupled to the processor 1330. The speaker 1340 transforms audio message data from the processor 1330 of the robot 1300 into mechanical vibrations producing sound. For example, the speaker 1340 may provide to the user navigational menu information, setting information, status information, information regarding the environment as detected by image data from the one or more cameras 1344, and the like. However, it should be understood that, in other embodiments, the robot 1300 may not include the speaker 1340.

The microphone 1342 is coupled to the communication path 1328 and communicatively coupled to the processor 1330. The microphone 1342 may be any device capable of transforming a mechanical vibration associated with sound into an electrical signal indicative of the sound. The microphone 1342 may be used as an input device 1338 to perform tasks, such as navigate menus, input settings and parameters, and any other tasks. It should be understood that some embodiments may not include the microphone 1342.

Still referring to FIG. 13, the camera 1344 is coupled to the communication path 1328 and communicatively coupled to the processor 1330. The camera 1344 may be any device having an array of sensing devices (e.g., pixels) capable of detecting radiation in an ultraviolet wavelength band, a visible light wavelength band, or an infrared wavelength band. The camera 1344 may have any resolution. The camera 1344 may be an omni-directional camera, or a panoramic camera. In some embodiments, one or more optical components, such as a mirror, fish-eye lens, or any other type of lens may be optically coupled to the camera 1344. As described in more detail below, the camera 1344 is a component of an imaging assembly 1322 operable to be raised above the housing 1310 to capture image data.

The network interface hardware 1346 is coupled to the communication path 1328 and communicatively coupled to the processor 1330. The network interface hardware 1346 may be any device capable of transmitting and/or receiving data via a network 1370. Accordingly, network interface hardware 1346 can include a wireless communication module configured as a communication transceiver for sending and/or receiving any wired or wireless communication. For example, the network interface hardware 1346 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 1346 includes hardware configured to operate in accordance with the Bluetooth wireless communication protocol. In another embodiment, network interface hardware 1346 may include a Bluetooth send/receive module for sending and receiving Bluetooth communications to/from a portable electronic device 1380. The network interface hardware 1346 may also include a radio frequency identification ("RFID") reader configured to interrogate and read RFID tags.

In some embodiments, the robot 1300 may be communicatively coupled to a portable electronic device 1380 via the network 1370. In some embodiments, the network 1370 is a personal area network that utilizes Bluetooth technology to communicatively couple the robot 1300 and the portable electronic device 1380. In other embodiments, the network 1370 may include one or more computer networks (e.g., a personal area network, a local area network, or a wide area network), cellular networks, satellite networks and/or a global positioning system and combinations thereof. Accordingly, the robot 1300 can be communicatively coupled to the network 1370 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 13, as stated above, the network 1370 may be utilized to communicatively couple the robot 1300 with the portable electronic device 1380. The portable electronic device 1380 may include a mobile phone, a smartphone, a personal digital assistant, a camera, a dedicated mobile media player, a mobile personal computer, a laptop computer, and/or any other portable electronic device capable of being communicatively coupled with the robot 1300. The portable electronic device 1380 may include one or more processors and one or more memories. The one or more processors can execute logic to communicate with the robot 1300. The portable electronic device 1380 may be configured with wired and/or wireless communication functionality for communicating with the robot 1300. In some embodiments, the portable electronic device 1380 may perform one or more elements of the functionality described herein, such as in embodiments in which the functionality described herein is distributed between the robot 1300 and the portable electronic device 1380.

The tactile feedback device 1348 is coupled to the communication path 1328 and communicatively coupled to the processor 1330. The tactile feedback device 1348 may be any device capable of providing tactile feedback to a user. The tactile feedback device 1348 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 1348.

The location sensor 1350 is coupled to the communication path 1328 and communicatively coupled to the processor 1330. The location sensor 1350 may be any device capable of generating an output indicative of a location. In some embodiments, the location sensor 1350 includes a global positioning system (GPS) sensor, though embodiments are not limited thereto. Some embodiments may not include the location sensor 1350, such as embodiments in which the robot 1300 does not determine a location of the robot 1300 or embodiments in which the location is determined in other ways (e.g., based on information received from the camera 1344, the microphone 1342, the network interface hardware 1346, the proximity sensor 1354, the inertial measurement unit 1336 or the like). The location sensor 1350 may also be configured as a wireless signal sensor capable of triangulating a location of the robot 1300 and the user by way of wireless signals received from one or more wireless signal antennas.

The motorized wheel assembly 1358 is coupled to the communication path 1328 and communicatively coupled to the processor 1330. As described in more detail below, the motorized wheel assembly 1358 includes motorized wheels (not shown) that are driven by one or motors (not shown). The processor 1330 may provide one or more drive signals to the motorized wheel assembly 1358 to actuate the motorized wheels such that the robot 1300 travels to a desired location, such as a location that the user wishes to acquire environmental information (e.g., the location of particular objects within at or near the desired location).

Still referring to FIG. 13, the light 1352 is coupled to the communication path 1328 and communicatively coupled to the processor 1330. The light 1352 may be any device capable of outputting light, such as, but not limited to, a light emitting diode, an incandescent light, a fluorescent light, or the like. Some embodiments include a power indicator light that is illuminated when the robot 1300 is powered on. Some embodiments include an activity indicator light that is illuminated when the robot 1300 is active or processing data. Some embodiments include an illumination light for illuminating the environment in which the robot 1300 is located. Some embodiments may not include the light 1352.

The proximity sensor 1354 is coupled to the communication path 1328 and communicatively coupled to the processor 1330. The proximity sensor 1354 may be any device capable of outputting a proximity signal indicative of a proximity of the robot 1300 to another object. In some embodiments, the proximity sensor 1354 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 1354, such as embodiments in which the proximity of the robot 1300 to an object is determine from inputs provided by other sensors (e.g., the camera 1344, the speaker 1340, etc.) or embodiments that do not determine a proximity of the robot 1300 to an object 1315.

The temperature sensor 1356 is coupled to the communication path 1328 and communicatively coupled to the processor 1330. The temperature sensor 1356 may be any device capable of outputting a temperature signal indicative of a temperature sensed by the temperature sensor 1356. In some embodiments, the temperature sensor 1356 may include a thermocouple, a resistive temperature device, an infrared sensor, a bimetallic device, a change of state sensor, a thermometer, a silicon diode sensor, or the like. Some embodiments of the robot 1300 may not include the temperature sensor 1356.

Still referring to FIG. 13, the robot 1300 is powered by the battery 1360, which is electrically coupled to the various electrical components of the robot 1300. The battery 1360 may be any device capable of storing electric energy for later use by the robot 1300. In some embodiments, the battery 1360 is a rechargeable battery, such as a lithium-ion battery or a nickel-cadmium battery. In embodiments in which the battery 1360 is a rechargeable battery, the robot 1300 may include the charging port 1362, which may be used to charge the battery 1360. Some embodiments may not include the battery 1360, such as embodiments in which the robot 1300 is powered the electrical grid, by solar energy, or by energy harvested from the environment. Some embodiments may not include the charging port 1362, such as embodiments in which the apparatus utilizes disposable batteries for power.

It should now be understood that embodiments of the present disclosure are directed deformable sensors capable of detecting contact with an object as well as a geometric shape and pose of an object. One or more deformable sensors may be provided on a robot, for example. The information provided by the deformable sensors may then be used to control the robot's interaction with target objects. The depth resolution and spatial resolution of the deformation sensors may vary depending on the location of the deformable sensors on the robot.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor for detecting force associated with an object, comprising:
    an enclosure comprising a housing and a deformable membrane;
    an internal sensor that is disposed within the enclosure and is configured to:
      view the deformable membrane; and
      output a deformation region within the deformable membrane as a result of contact with the object; and
    a filter coupled to the internal sensor.

2. The deformable sensor of claim 1, wherein the housing comprises a conduit configured to provide cabling for power or signals to or from the deformable sensor.

3. The deformable sensor of claim 1, wherein pressure within the deformable sensor is specified by a pressurization parameter and is inversely proportional to deformability of the deformable sensor.

4. The deformable sensor of claim 1, further comprising a plurality of internal sensors disposed within the enclosure.

5. The deformable sensor of claim 1, wherein deformability of the deformable sensor is modified by a change of pressure within the enclosure due to membrane material or media material.

6. The deformable sensor of claim 1, wherein the internal sensor comprises a time of flight sensor.

7. The deformable sensor of claim 1, wherein the deformable membrane further comprises a filter layer configured to scatter an internal signal emitted by the internal sensor.

8. The deformable sensor of claim 1, wherein a filter layer, disposed on a bottom surface of the deformable membrane, comprises a coating or a pattern.

9. A method for sensor-based detection of force associated with an object, comprising:
    receiving, by a processor, a signal from a deformable sensor comprising data with respect to a deformation region in a deformable membrane resulting from contact with the object utilizing an internal sensor disposed within an enclosure and having a field of view through a filter and toward the deformable membrane; and
    determining, by the processor, an amount of force applied between the deformable membrane and the object based on the deformation region.

10. The method of claim 9, further comprising modifying deformability of the deformable sensor by changing pressure within the enclosure.

11. The method of claim 9, further comprising outputting, by the processor, for display on a device, output of the deformable sensor as the object deforms the deformable membrane.

12. The method of claim 9, further comprising:
    determining, by the processor, a pose of the object; and
    outputting, by the processor, a vector that is normal to a surface in the deformation region.

13. The method of claim 9, further comprising scattering the optical signal emitted by the internal sensor of an internal signal emitted by the internal sensor via a filter layer disposed on a bottom surface of the deformable membrane.

14. The method of claim 13, wherein analyzing, by the processor, the deformation region further comprises measuring changes to a coating or a pattern on the bottom surface of the deformable membrane.

15. The method of claim 9, wherein the internal sensor comprises a time of flight sensor.

16. A system for detecting force associated with an object, comprising:
    an enclosure comprising a housing and a deformable membrane;
    an internal sensor that is disposed within the enclosure and is configured to:
      view the deformable membrane; and
      output a deformation region within the deformable membrane as a result of contact with the object;
    a filter coupled to the internal sensor; and
    a processor configured to:
      receive data from the internal sensor representing the deformation region; and
      determine an amount of force applied between the deformable membrane and the object.

17. The system of claim 16, wherein the processor is further configured to determine a vector normal to a surface of the object based on the data representing the deformation region.

18. The system of claim 17, wherein the processor is further configured to utilize the vector to determine which direction the object is oriented.

19. The system of claim 16, wherein the internal sensor comprises a time of flight sensor.

* * * * *